INVENTOR.
ROBERT L. AMSTER

United States Patent Office 3,577,350
Patented May 4, 1971

3,577,350
EUROPIUM AND MANGANESE ACTIVATED SODIUM OR POTASSIUM ALUMINATE PHOSPHORS
Robert L. Amster, Great Neck, N.Y., assignor to General Telephone & Electronics Laboratories, Incorporated
Filed Nov. 27, 1968, Ser. No. 786,804
Int. Cl. C09k 1/68
U.S. Cl. 252—301.4        6 Claims

ABSTRACT OF THE DISCLOSURE

A phosphor system consisting of an alkali metal β-alumina activated by divalent europium or by divalent europium together with divalent manganese. These phosphors are photoluminescent and cathodoluminescent and are suitable for use in fluorescent lamps or cathode ray tube screens.

BACKGROUND OF THE INVENTION

Field of the invention

Figure 1:
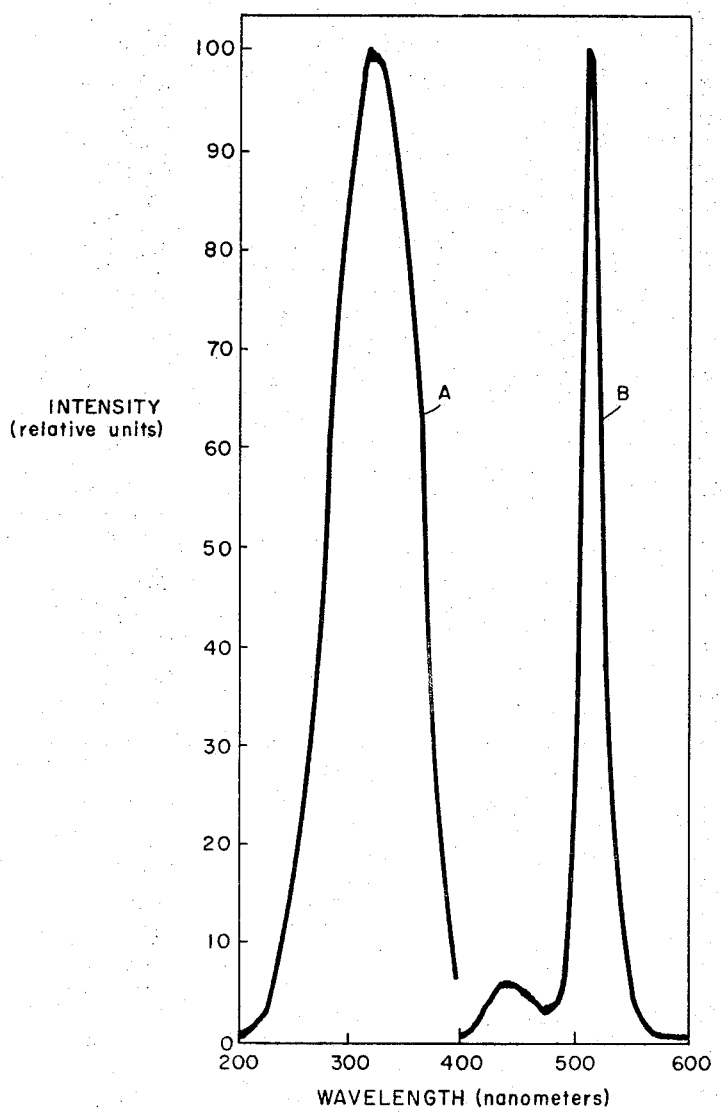

This invention relates to fluorescent materials which emit light when exposed to ultraviolet or electron radiation. In particular, it relates to alkali metal β-alumina activated by divalent europium and divalent manganese and to alkali metal β-alumina activated by europium alone, as well as to methods of making these phosphors.

Description of the prior art

Host materials consisting of alkali metal β-alumina compounds are known (see "Some Aspects of the Luminescene of Solids," Kroeger, Elsevier Publishing Co. Inc. 1948). Both sodium aluminate activated by manganese and potassium aluminate activated by manganese are known to exhibit relatively weak green emission having a maximum at approximately 510 nanometers when excited by cathode rays or by ultraviolet light. Divalent europium has been used as an activator in a variety of host systems.

SUMMARY OF THE INVENTION

I have discovered that when divalent europium is added to manganese activated sodium or potassium β-alumina the green fluorescence intensity of the manganese is greatly enhanced for cathode ray and ultraviolet excitation. Further, when sodium or potassium β-alumina is singly activated with divalent europium, a phosphor is obtained which emits radiation in the blue region of the spectrum when excited by cathode rays or by ultraviolet radiation. More specifically, the present invention relates to phosphors defined by the formula $$M_2O \cdot 6Al_2O_3 : xEu^{2+}, yMn^{2+}$$

where M as an alkali metal selected from the group consisting of sodium and potassium, $x$ is a quantity in the range 0.016 to 0.28, and $y$ is a quantity in the range 0 to 0.76.

The present europium-manganese activated phosphor had a broad absorption band in the ultraviolet region extending from 200 to 400 nanometers. Much of the energy absorbed by the europium is transferred to the divalent manganese ions which then emit their characteristic fluorescence peaking at about 510 nanometers. An energy transfer effect is also observed when the phosphor is excited with cathode radiation. It has been found, however, that the incorporation of other activators known to transfer energy to manganese, such as cerium, tin, copper, and lead, does not result in observable enhancement of manganese emission for either cathode ray or ultraviolet excitation.

When potassium or sodium β-alumina is activated by europium alone ($y=0$ in the above general formula), the resulting material emits blue radiation when excited by cathode rays or ultraviolet light. This emission is characteristic of divalent europium. Other rare-earth activators such as terbium, holmium, dysprosium, and samarium do not, however, yield detectable luminescence under cathode ray or ultraviolet excitation.

The mechanism underlying luminescence in the present phosphor system are not fully understood, but it is believed that energy transfer from the europium-oxygen complex [$Eu^{3+}-O^{2-}$] to both divalent europium and divalent manganese is of primary significance. This energy transfer is believed to occur in the europium-activated (only) phosphor where transfer is from the complex to divalent europium, as well as in the europium-manganese-activated phosphor where the important transfer is from the complex to the divalent manganese.

The europium-manganese activated phosphor of this invention can be synthesized by dry blending europium fluoride and manganese fluoride with powdered α-alumina and a fluoride composition defined by the formula MF where M is selected from the group consistng of potassium and sodium. The blend is fired in a hydrogen atmosphere at approximately 1180° C. for three hours and then allowed to cool to room temperature. The use of fluoride compounds rather than the usually-employed oxygen compounds results in phosphors of a more homogeneous nature and a higher luminescent efficiency.

EXAMPLE 1

0.24 gram of vacuum dried KF and 1.18 grams of $αAl_2O_3$ were dry blended with 0.4 gram of $EuF_3$ and 0.065 gram of $MnF_2$. The blend was placed in an alumina crucible and fired in a hydrogen atmosphere in a quartz reaction tube located in a tube furnace. The temperature in the furnace was brought from ambient to 1180° C. and maintained for three hours. The reaction tube was then removed from the furnace and allowed to cool to room temperature.

The resultant phosphor

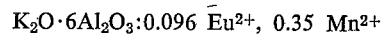
$$K_2O \cdot 6Al_2O_3 : 0.096\ Eu^{2+},\ 0.35\ Mn^{2+}$$

was excited by radiation in the range 200 to 400 nanometers. Excitation curve A of FIG. 1 was obtained by measuring the intensity of the radiation of the phosphor at 510 nanometers as the excitation wavelength was varied through the 200 to 400 nanometer range. It is seen that emission was obtained over a wide range of excitation wavelengths centered at about 320 nanometers. Curve B illustrates the emission spectrum peaking at approximately 510 nanometers which was obtained when the phosphor was excited by radiation having a wavelength of 320 nanometers.

Figure 2:
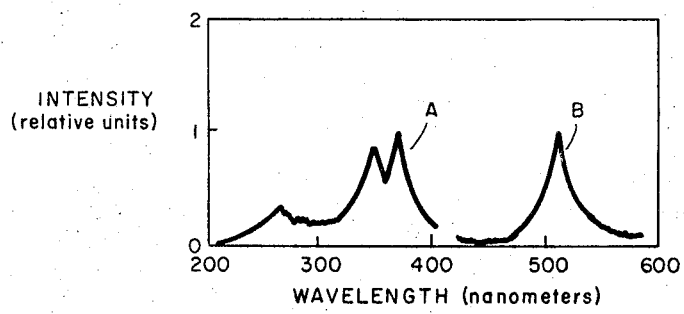

FIG. 2 shows excitation (A) and emission (B) curves for the phosphor

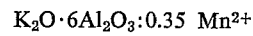
$$K_2O \cdot 6Al_2O_3 : 0.35\ Mn^{2+}$$

The curves were obtained in the same manner as the curves of FIG. 1, except that the emission curve B was obtained by exciting the phosphor at 380 nanometers, the value producing maximum fluorescence at 510 nanometers. Comparing the emission spectrum of the

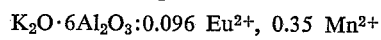
$$K_2O \cdot 6Al_2O_3 : 0.096\ Eu^{2+},\ 0.35\ Mn^{2+}$$

with that of the

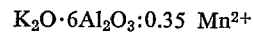
$$K_2O \cdot 6Al_2O_3 : 0.35\ Mn^{2+}$$

it is seen that both phosphors have emission peaks at 510 nanometers, characteristic of divalent manganese emission. However, the peak intensity of the europium-containing phosphor is of the order of 100 times greater than that obtained from its europium-less counterpart.

The $$K_2O \cdot 6Al_2O_3 : 0.96\ Eu^{2+},\ 0.35\ Mn^{2+}$$

phosphor was next excited by cathode radiation and emitted a bright green fluorescence at 510 nanometers. This is in contrast to its europium-less counterpart which exhibited only a weak emission at 510 nanometers when excited by the same cathode radiation.

The relative intensity of $$K_2O \cdot 6Al_2O_3 : 0.096\ Eu^{2+},\ 0.35\ Mn^{2+}$$

was also obtained by comparing it with the emission from commercially available green-emitting phosphors, manganese activated zinc silicate and manganese activated magnesium gallate. Measurements were made using medium and low pressure mercury lamp excitation as well as cathode ray excitation. Comparison of intensity was measured taking into account the sensitivity of the human eye. The results, including comparison with the europium-les phosphor are listed in the following table:

| Phosphor | Relative intensities | | |
|---|---|---|---|
| | Medium pressure Hg lamp | Low pressure Hg lamp | Cathode ray |
| $K_2O \cdot 6\ Al_2O_3 : Eu^{2+},\ Mn^{2+}$ | 100 | 86 | 75 |
| $K_2O \cdot 6\ Al_2O_3 : Mn^{2+}$ | <5 | <5 | <5 |
| $Zn_2SiO_4 : Mn^{2+}$ | <5 | 100 | 100 |
| $MgGaO_2 : Mn^{2+}$ | 16 | 43 | 45 |

EXAMPLE II

A phosphor was prepared by the method of Example I except that 0.18 gram of NaF was blended with 0.04 gram of $EuF_3$, 1.18 grams of $\alpha Al_2O_3$, and 0.065 gram of $MnF_2$. The resultant phosphor $$Na_2O \cdot 6Al_2O_3 : 0.096\ Eu^{2+},\ 0.35\ Mn^{2+}$$

had an emission peak at about 515 nanometers, and, like the potassium material, exhibited enhanced photoluminescent and cathodoluminescent response as compared to its europium-less counterpart.

EXAMPLE III

A first sample of europium activated alkali metal β-alumina was made by dry blending 0.24 gram of vacuum dried KF and 1.18 grams of $\gamma Al_2O_3$ with 0.04 gram of $EuF_3$. The material was placed in an alumina crucible and fired in a quartz reaction tube located in a tube furnace. The temperature in the furnace was brought from ambient to 1150° C. and kept at this temperature during a three hour firing in hydrogen. The material was then removed from the furnace and allowed to cool to room temperature while maintaining the hydrogen atmosphere.

The resultant phosphor, $$K_2O \cdot 6Al_2O_3 : 0.096\ Eu^{2+}$$

exhibited a blue emission under excitation by ultraviolet radiation or cathode radiation. The phosphor has a broad photoexcitation band having a maximum at about 315 nanometers and emits fluorescence which peaks at approximately 448 nanometers for both ultraviolet and cathode ray excitation.

A second sample having the same composition was prepared in the same manner except that the firing was performed at 1250° C. The resulting phosphor's photoexcitation and emission maxima were found to be at a higher wavelength than those of the first sample, being 350 and 455 nanometers, respectively. The second sample was also found to have a higher photoluminescent and cathodoluminescent intensity than the first sample. The relative intensity of each sample of $$K_2O \cdot 6Al_2O_3 : 0.096\ Eu^{2+}$$

was obtained by comparing the emissions with commercially available blue-emitting phosphors, silver activated zinc sulfide and tin activated strontium phosphate, in the same manner as in Example I. The results appear in table of Example IV.

EXAMPLE IV

A phosphor was prepared by the same method as used to prepare the first sample of Example III except that 0.18 gram of NaF was blended with 0.04 gram of $EuF_3$ and 1.18 grams of $\gamma Al_2O_3$. The resultant phosphor $$Na_2O \cdot 6Al_2O_3 : 0.096\ Eu^{2+}$$

emitted blue luminescence when excited by ultraviolet radiation or cathode radiation. This phosphor has a broad photoexcitation band peaking at approximately 320 nanometers and an emission peak at approximately 460 nanometers, a somewhat longer wavelength than its potassium analog. The relative intensity of $$Na_2O \cdot 6Al_2O_3 : 0.096\ Eu^{2+}$$

was measured by comparing it with the commercially available blue-emitting phosphors, silver activated zinc sulfide and tin activated strontium phosphate, as well as with the potassium phosphors of Example III. Measurements were made in the same manner as in Example I. The results are listed in the following table:

| Phosphor | Relative intensities | | |
|---|---|---|---|
| | Medium pressure Hg lamp | Low pressure Hg lamp | Cathode ray |
| $K_2O \cdot 6Al_2O_3 : 0.096\ Eu^{2+}$ a | 65 | 65 | 32 |
| $K_2O \cdot 6Al_2O_3 : 0.096\ Eu^{2+}$ b | 87 | 82 | 100 |
| $Na_2O \cdot 6Al_2O_3 : 0.096\ Eu^{2+}$ | 100 | 77 | 50 |
| $ZnS : Ag^+$ | 33 | | 68 |
| $Sr_2P_2O_7 : Sn^{2+}$ | | 100 | | a Fired at 1,150° C.
b Fired at 1,250° C.

EXAMPLE V

Additional samples were prepared of phosphor compositions having the formula $$K_2O \cdot 6Al_2O_3 : xEu^{2+}$$

in which $x$ was varied between 0.016 and 0.28. Both methods of preparation set forth in Example III were used. In all cases blue-emitting phosphors were obtained but their intensities were somewhat less than those exhibited by the phosphors of Example III.

EXAMPLE VI

Additional samples were prepared of phosphor compositions having the formula $$Na_2O \cdot 6Al_2O_3 : xEu^{2+}$$

in which $x$ was varied between 0.016 and 0.28. In all cases blue-emitting phosphors were obtained but their intensities were somewhat less than that exhibited by the phosphor of Example IV.

EXAMPLE VII

Additional samples were prepared of phosphor compositions having the formulas $$K_2O \cdot 6Al_2O_3 : xEu^{2+},\ y\ Mn^{2+}$$

and $$Na_2O \cdot 6Al_2O_3 : xEu^{2+},\ y\ Mn^{2+}$$

in which $x$ was varied between 0.016 and 0.28 and $y$ between 0 and 0.76. When $y$ was set equal to 0, the blue-emitting phosphors of Example V and Example VI were obtained. As $y$ was increased slightly, the phosphor produced began to exhibit some manganese emission and looked bluish-green. When $y$ was increased past about 0.1, the exhibited emission was predominantly green, but this figure varied to some extent with the europium concentration. The green-emitting phosphors of this example were found to be less intense than the phosphors of Example I and Example II.

While typical examples have been illustrated and described, it is to be understood that all matter contained

What is claimed is:

1. A phosphor composition defined by the formula $$M_2O \cdot 6Al_2O_3 : xEu^{2+}, yMn^{2+}$$

wherein M is an alkali metal selected from the group consisting of sodium and potassium, $x$ is a quantity in the range 0.016 to 0.28, and $y$ is a quantity in the range 0 to 0.76.

2. The composition of matter as defined by claim 1 where $y$ equals zero.

3. The composition of matter as defined by claim 2 where $x$ equals approximately 0.096.

4. The composition of matter as defined by claim 1 where $x$ equals approximately 0.096 and $y$ equals approximately 0.35.

5. The method of preparing a phosphor having the formula $$M_2O \cdot 6Al_2O_3 : Eu^{2+}, Mn^{2+}$$

where M is an alkali metal selected from the group consisting of potassium and sodium, said method comprising the steps of:
(a) blending europium fluoride and manganese fluoride with α-alumina and a fluoride composition defined by the formula MF,
(b) firing the blend for approximately 3 hours at a temperature of 1180° C. in a hydrogen atmosphere, and
(c) allowing the resultant phosphor to cool to room temperature.

6. The method of preparing a phosphor having the formula $$M_2O \cdot 6Al_2O_3 : Eu^{2+}$$

where M is selected from the group consisting of potassium and sodium, said method comprising the steps of:
(a) blending europium fluoride with γ-alumina and a fluoride composition defined by the formula MF,
(b) firing the blend for approximately 3 hours at a temperature of 1150° C. in a hydrogen atmosphere, and
(c) allowing the resultant phosphor to cool to room temperature.

References Cited

UNITED STATES PATENTS 3,294,699  12/1966  Lange _____ 252—301.4

TOBIAS E. LEVOW, Primary Examiner

R. D. EDMONDS, Assistant Examiner